United States Patent [19]

Schrock

[11] 4,375,872
[45] Mar. 8, 1983

[54] DRAFT CONTROL FOR STOVES AND FURNACES

[76] Inventor: Andrew J. Schrock, Rte. #1 Adario E. Rd., Shiloh, Ohio 44878

[21] Appl. No.: 182,797

[22] Filed: Oct. 8, 1980

[51] Int. Cl.³ .................................................. G05D 23/02
[52] U.S. Cl. ......................................... 236/16; 236/96
[58] Field of Search .............. 236/96, 1 G, 16, 101 E, 236/49

[56] References Cited
U.S. PATENT DOCUMENTS

| | | | |
|---|---|---|---|
| 2,022,460 | 11/1935 | Dutcher | 236/16 |
| 2,223,918 | 12/1940 | Monney | 236/96 |
| 2,437,878 | 3/1948 | Dunville | 236/96 X |
| 2,454,044 | 11/1948 | Eggert | 236/96 |
| 2,709,551 | 5/1955 | Bower et al. | 236/96 |
| 2,793,811 | 5/1957 | Coselman | 236/96 X |
| 3,595,475 | 7/1971 | Morton | 236/101 E X |

Primary Examiner—William E. Tapoloai

[57] ABSTRACT

A draft control unit for stoves and furnaces comprising housings of variable design, wherein may be incorporated a bi-metal element or means for remote control. An eccentric control rod supplies adjustment means for said bi-metal and a draft door with means of self adjustment to stove.

2 Claims, 3 Drawing Figures

U.S. Patent    Mar. 8, 1983    4,375,872
FIG. 1
FIG. 2
FIG. 3
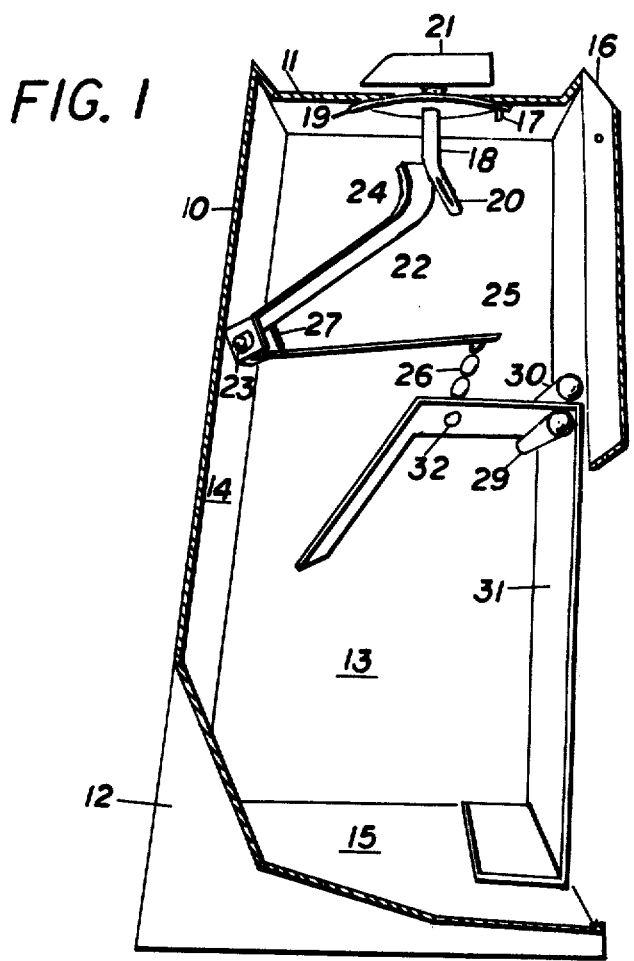
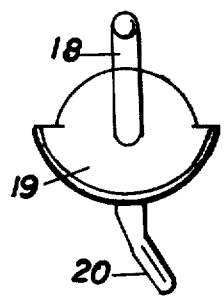
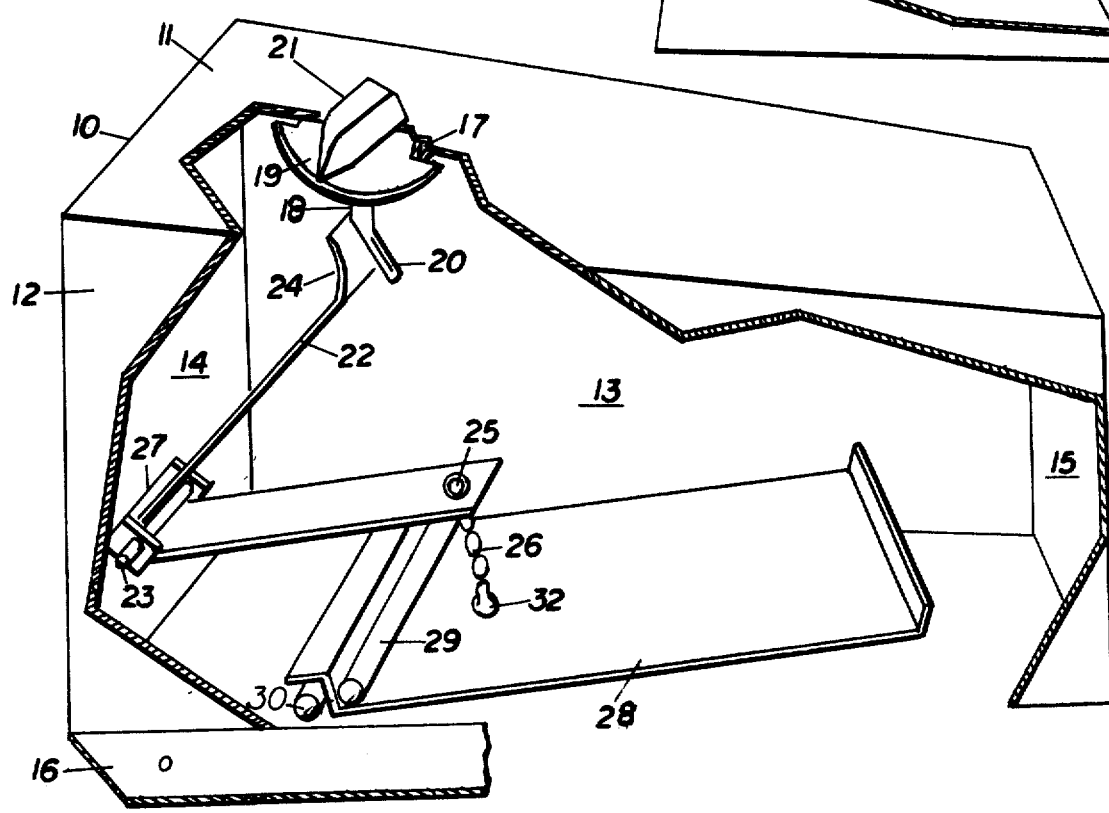

DRAFT CONTROL FOR STOVES AND FURNACES

FIELD OF INVENTION

The present invention relates generally to combustion draft control units for wood-coal stoves annd furnaces. More specifically, it relates to automatic, non-electric, compact, self-contained units using a bi-metal element or means for remote control.

DESCRIPTION OF PRIOR ART

In prior art of bi-metal controls, it is customary practice to coil the bi-metal over the control rod and by use of a chain, connection is made from the bi-metal to the draft door. By use of said bi-metal coil in operation and when movement is toward the horizontal position, an undesirable effect is realized whereby responsive movement is lost, thereby less efficiency. Various designs of prior art mounted the bi-metal within the path of room air entering as draft. Such an arrangement in the early stage of combustion has a tendency to carry away too much heat from the bi-metal resulting in a tendency for the stove to overheat at the flue before adequate heat travels to the bi-metal and shutting down the stove. One such U.S. patent typifying such an arrangement is No. 2,948,276 issued to G. W. Harding.

My invention is distinguished from this prior art in that it provides an arrangement whereby the bi-metal is protected from direct draft, accomplished by arranging the bi-metal behind the draft door and still maintaining the desirable effect of slightly more draft in the early stage of combustion. Further my invention uses a bi-metal element in a Vee shape form, allowing even and full response of the bi-metal movement.

SUMMARY OF THE INVENTION

The present invention was conceived to provide a draft control unit adaptable to most any stove, furnace or boiler with the least effort in its construction design. Further adaptability to different requirements only by changing minor parts or housing unit.

The present invention comprising a housing unit of slight various designs (depending on its use) further consisting of a Vee shaped bi-metal element or means for remote source of control, an eccentric control rod assembly, a draft door with means for hinge effect and self adjustment at closing point. The objectives of the various species of my invention is to overcome the disadvantages and limitation of prior draft controls, providing versatility and fullfilling the following achievements.

(1) With minor changes such as different size sheet steel, different punches, ets, the different species may be fabricated with the same tooling.

(2) By varying the eccentric of the control rod a greater or smaller movement is resulted, allowing great flexibility for use of same species of control in a different heat range or stove design.

(3) Control rod rotational movement up to 180 degrees permitting precise draft adjustment.

(4) Great versatility whereby the various species may be mounted on top or side of most any stove, furnace or boiler to the best advantage of its design.

(5) Self adjusting draft door design used on most of the species, provide for:
Quick mounting of control to stove.
Ensuring the proper seal when in closed position.

(6) A compact complete ready to mount control of sturdy simplified construction for economical manufacture, long reliable service life with minimum maintenance.

The foregoing and other objects and advantages of the various species of my invention will be better understood from the following discription to be considered in connection with the accompanying drawings of a preferred embodiment.

BRIEF DESCRIPTION OF THE DRAWINGS

FIG. 1 is a perspective view of the preferred embodiment of the side mount species of my invention with a portion broken away.

FIG. 2 is a perspective view of the control rod.

FIG. 3 is a perspective view of the preferred embodiment of the top mount species of my invention with a portion broken away.

DESCRIPTION OF THE PREFERRED EMBODIMENT

Referring to FIG. 1, FIG. 2 and FIG. 3 of the drawings, numeral 10 refers to the housing units of the various species. The one side 11 is regarded as the top or face wall, 12 and 13 are the two side walls and depending on its species, wall 14 and 15 may also be provided with options in wall 15 for having louvers in same. One side always remains open for mounting to the heating unit. From the side walls 12 and 13 a flange 16 is bent 90 degrees away from said side walls for the purpose of mounting the unit.

To the top or face wall 11 a hole is provided for mounting the control rod 18 and adjacent a projection 17 stamped downward forming a stop restricting control rod 18 rotation movement to 180 degrees.

Referring now to FIG. 2, control rod 18 consists of a main shaft with a notched disc 19, 90 degrees to its axle. One half of said disc 19 covers a greater radius, thereby forming a stop in connection with the projection 17 of the top or face wall 11. Below said flange an eccentric 20 extends downward and angularly away from main shaft and said disc 19. A control knob 21 and tension spring is used in connection with control rod 18 for manual adjustment of the bi-metal element 22.

Referring to FIGS. 1 and 3 a Vee shaped bi-metal element 22 extends angularly downward and toward one side wall 14 from communication with the eccentric 20 of the control rod 18. The bottom of the Vee shaped bi-metal element 22 pivots on a shaft 23 forming a hinge effect. A bend is formed to the one end of the bi-metal element 22, in matching relation to the angle 20 of the eccentric 20 when in closed position. The opposite end of the bi-metal element 22 means is provided for a chain connection 25. A mounting bracket 27 is welded to the one wall 14 with two flanges bend 90 degrees from main body, with holes for accomodating shaft 23. Referring to FIG. 3, the draft door 28 is pivoted between two rods 29 and 30 resulting in a hinge effect and means for self adjustment of the draft door 28 to the draft opening (not shown) of the heating unit to which this control would be mounted. Referring now to the preferred embodiment in FIG. 3, the one end of the draft door 28, a stiffening flange is bent 90 degrees inward from main body. At opposite end a 90 degree bend is formed also inward, and further from this last bend another 90 degree bent outward and relative parallel to main body. The distance from these two last bends approximately twice the thickness of the rods 29 or 30, resulting in a slight floating effect of draft door 28 and 31 to their advantage for proper adjustment to draft opening (not shown). The rods 29 and 30 are welded between and to the 2 side walls 12 and 13, rod 29 is welded slightly inward from rod 30, resulting in freer movement of the draft doors 28 and 31 throughout their average swing, further distance between rods 29 and 30 being slightly more than the thickness of draft doors 28 and 31.

Referring now particularly to FIG. 1 a slightly different draft door 31 is used. Also to the one end a stiffening flange is bend 90 degrees inward and opposite end another 90 degree bend is made inward extending approximately halfway across the housing, further from this last bend another approximately 45 degree bend is made downward and approximately 135 degrees in relation to main body and the length so it will just clear the wall 14 when in open position. Connection means 32 for a chain connection 26 is provided in both species.

The advantages and purpose of the various elements of my invention described may now be understood considering the following. First assuming the heater would be built with a rectangular or square draft opening projecting three-eights of an inch from its body and the control would be so mounted that the one edge is adjacent below rod 29. The control unit being in room temperature is such assembled so when the eccentric 20 is in closed position that the draft door 28 and 31 are also just closed. Now we will turn the control know 21, 90 degrees (12 o'clock position) and the eccentric 20 will move against the bi-metal 22 causing opening of the draft doors 28 and 31. Now assume the unit is heated to normal operating temperatures causing the Vee shaped bi-metal 22 to close the doors 28 and 31. Now referring to FIG. 1, the chain connection 26 is angled slightly backward toward the mounting side from point 32, resulting in the draft door 31 being pulled in towards the top sealing flange (not shown—or draft inlet opening of the heating unit) as the door 31 moves toward its closing position and the bottom edge of door 31 is pulled in (toward draft inlet opening—not shown) by gravity of the overhang in door 31 resulting now in all around seal. Further a slight clearance is maintained between the draft doors 28 and 31 and rods 29 and 30, allowing the doors 28 and 31 to slightly rock within its pivot resulting in self adjusting means of its sealing point.

Now let's assume we want to mount this control with the same housing design on a heater or point that will operate at a higher temperature. By use of a simple bending jig with different stops, the eccentric 20 of the control rod 18 may be bent to any desired point within the operating range of the heater. It is to be noted by bending the eccentric 20 more or less from the center axle of control rod 18 that double this amount, more or less result in bi-metal 22 movement. So to accommodate the heater, the eccentric 20 may be bent to any normal operating range and to the point so that when the control is in full open position, the heater cannot overheat before the bi-metal 22 closes the draft doors 28 and 31.

While I have described a preferred embodiment and art of several species of my invention, it will be apparent to those skilled in the art, that various changes may be made in the size, shape, design, with addition or various arrangements of parts described hereinbefore. For example with the use of magnetic catches in combination with the draft door 28 as per FIG. 3, this control could be applied to applications of vertical mounts and also possibility to advantage for efficiency of certain heaters. Referring to FIG. 1, this unit is designed for vertical mounting and could likewise be mounted in the horizontal position without any change. It is to be noted that the two species of housing units used in horizontal mounting provide options for the control knob 21 on a top or side wall and likewise for vertical mounting.

Further example, is by use of a manual or remote sensing control, by use of a push-pull cable or sensing bulb, capillary and bellows, or sensing bulb, capillary and piston, whereby the bi-metal 22 and control rod 18 would not be used. Again it would be possible to use the bi-metal 22 and control rod 18, with different or remote draft door and or housing unit. These and other modifications and changes may be made as desired without departing from the principles of the various species. Accordingly it is intended to embrace all such alternatives and modifications which fall within the scope and spirit of the appended claims.

I claim:

1. A draft control comprising p1 (a) an outer housing having a face wall and side walls, in said face wall formed a projection and adjacent an aperture accommodating (b) a control rod comprising a pivot shaft, slightly off-centered within a notched disc affixed 90 degree to its axle, said notched disc communicating with said projection, restricting rotational movement of said pivot shaft to 180 degree and further relative with an eccentric formed under said notched disc of said control rod for adjusting the location of (c) a Vee shaped bimetallic element, pivoted at its bottom, one end of said bimetallic element accommodating and in communication with said eccentric of said control rod;

(d) a retainer and shaft forming pivoting means for said Vee shaped bimetallic element, said retainer affixed to said one side wall;

(e) two parallel slightly spaced rods affixed to and between the lower edge of two of the said walls and further adjacent said bimetallic element, forming pivoting and self-adjustment means of (f) a draft door with stiftening bends and one end bend and formed, pivoting between said parallel slightly spaced rods and further means for preferably chain connection from said draft door to other end of said vee shaped bimetallic element.

2. A draft control comprising (a) an outer housing having a face wall and preferably 2 side walls, in said face wall formed a projection and adjacent an aperture accommodating (b) a control rod comprising a pivot shaft, slightly off-centered within a notched disc, affixed 90 degree to its axle, said notched disc communicating with said projection restricting rotational movement of said pivot shaft to 180 degree and further relative with an eccentric formed under said notched disc of said control rod for adjusting the location of (c) a Vee shaped bimetallic element, pivoted at its bottom, one end of said bimetallic element accommodating and in communication with said eccentric of said control rod;

(d) a retainer forming pivoting means for said Vee shaped bimetallic element affixed between said two side walls;

(e) a draft door pivoting and relative responsive with other end of said Vee shaped bimetallic element.

* * * * *